US006938050B2

(12) United States Patent
Le et al.

(10) Patent No.: US 6,938,050 B2
(45) Date of Patent: Aug. 30, 2005

(54) CONTENT MANAGEMENT SYSTEM AND METHODOLOGY EMPLOYING A TREE-BASED TABLE HIERARCHY WHICH ACCOMODATES OPENING A DYNAMICALLY VARIABLE NUMBER OF CURSORS THEREFOR

(75) Inventors: Khanh M. Le, Austin, TX (US); Tawei Hu, San Jose, CA (US); Edward J. Perry, Cary, NC (US); Howard Zhang, San Jose, CA (US); Lily L. Liang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 10/128,450

(22) Filed: Apr. 23, 2002

(65) Prior Publication Data

US 2003/0204478 A1 Oct. 30, 2003

(51) Int. Cl.[7] .............................................. G06F 17/30
(52) U.S. Cl. ..................................... 707/103 R; 707/10
(58) Field of Search .................... 707/1–10, 100–104.1; 709/203, 223, 225, 251, 227; 717/126, 172, 108; 714/38; 307/42; 370/386

(56) References Cited

U.S. PATENT DOCUMENTS

| | | |
|---|---|---|
| 4,751,740 A | 6/1988 | Wright |
| 4,969,091 A | 11/1990 | Muller |
| 5,615,337 A | 3/1997 | Zimowski et al. |
| 5,644,768 A | 7/1997 | Periwal et al. |
| 5,742,810 A | 4/1998 | Ng et al. |
| 5,774,719 A | 6/1998 | Bowen |
| 5,778,398 A | 7/1998 | Nagashima et al. |
| 5,799,310 A | 8/1998 | Anderson et al. |
| 5,819,252 A | 10/1998 | Benson et al. |

(Continued)

FOREIGN PATENT DOCUMENTS

WO    WO 99/22362    5/1999

OTHER PUBLICATIONS

Jeonghee Kim, Taissok Han, and Suk Kyoon Lee, "Visualization of Path Expressions in a Visual Object–Oriented Database Query Language," (2 pages).

Chien–Lee, Ye–In Chang, and Wei–Pang Yang, "Design Of A New Indexing Organization For A Class–Aggregation Hierarchy In Object–Oriented Databases", Journal of Information Science and Engineering 15, 1999, pp. 217–241, Taiwan.

Jörn W. Janneck and Martin Naedele, "Modeling Hierarchical and Recursive Structures Using Parametric Petri Nets." Computer Engineering and Networks Laboratory, Swiss Federal Institute of Technology Zurich, pp. 445–452.

Akira Kawaguchi, Daniel Lieuwen, Inderpal Mumick, Kenneth Ross, "Implementing Incremental View Maintenance in Nested Data Models" Database Programming Languages, 6th International Workshop, DBPL–6, Aug. 18–20, 1997 Proceedings, pp. 203–221.

Li Tian–Zhu, "Normalization of Nested Structure for Complex Objects" in Chinese, Journal of Software, vol. 9, No. 5, p. 390–396, May 1998, (with English Abstract).

*Primary Examiner*—Diane D. Mizrahi
(74) *Attorney, Agent, or Firm*—Mark P. Kahler

(57) ABSTRACT

A content management system is provided including a plurality of tables forming a tree-based hierarchy for storing information such as item information. An information retrieval interface is provided to facilitate retrieval of information from the tree-based table hierarchy. The number of cursors employed for retrieving information is dynamically variable with the number of tables in the hierarchy. Advantageously, the content management system permits tables to be added or appended to the initial tree-based table hierarchy after the database is created. The number of cursors is dynamically varied to accommodate the additional cursors needed to query the additional table or tables.

18 Claims, 6 Drawing Sheets

U.S. PATENT DOCUMENTS

| | | |
|---|---|---|
| 5,862,378 A | 1/1999 | Wang et al. |
| 5,875,332 A | 2/1999 | Wang et al. |
| 5,892,902 A | 4/1999 | Clark |
| 5,940,616 A | 8/1999 | Wang |
| 6,012,067 A | 1/2000 | Sarkar |
| 6,016,394 A | 1/2000 | Walker |
| 6,047,291 A | 4/2000 | Anderson et al. |
| 6,055,637 A | 4/2000 | Hudson et al. |
| 6,063,133 A | 5/2000 | Li et al. |
| 6,065,117 A | 5/2000 | White |
| 6,067,414 A | 5/2000 | Wang et al. |
| 6,088,524 A | 7/2000 | Levy et al. |
| 6,104,393 A | 8/2000 | Santos-Gomez |
| 6,128,621 A | 10/2000 | Weisz |
| 6,148,342 A | 11/2000 | Ho |
| 6,161,182 A | 12/2000 | Nadooshan |
| 6,167,405 A | 12/2000 | Rosensteel, Jr. et al. |
| 6,173,400 B1 | 1/2001 | Perlman et al. |
| 6,219,826 B1 | 4/2001 | De Pauw et al. |
| 6,233,586 B1 | 5/2001 | Chang et al. |
| 6,263,313 B1 | 7/2001 | Milsted et al. |
| 6,263,342 B1 | 7/2001 | Chang et al. |
| 6,272,488 B1 | 8/2001 | Chang et al. |
| 6,279,111 B1 | 8/2001 | Jensenworth et al. |
| 6,282,649 B1 | 8/2001 | Lambert et al. |
| 6,289,344 B1 | 9/2001 | Braia et al. |
| 6,289,458 B1 | 9/2001 | Garg et al. |
| 6,292,936 B1 | 9/2001 | Wang |
| 6,308,274 B1 | 10/2001 | Swift |
| 6,314,449 B1 | 11/2001 | Gallagher et al. |
| 6,327,629 B1 | 12/2001 | Wang et al. |
| 6,338,056 B1 | 1/2002 | Dessloch et al. |
| 6,339,777 B1 | 1/2002 | Attaluri et al. |
| 6,343,286 B1 | 1/2002 | Lee et al. |
| 6,539,396 B1 * | 3/2003 | Bowman-Amuah ..... 707/103 R |
| 6,550,057 B1 * | 4/2003 | Bowman-Amuah ......... 717/126 |
| 6,578,068 B1 * | 6/2003 | Bowman-Amuah ......... 709/203 |
| 6,601,234 B1 * | 7/2003 | Bowman-Amuah ......... 717/108 |
| 2001/0002486 A1 | 5/2001 | Kocher et al. |
| 2001/0008015 A1 | 7/2001 | Vu et al. |
| 2001/0019614 A1 | 9/2001 | Madoukh |

* cited by examiner

APPLICATION CODE — 40

| | |
|---|---|
| 50) | DECLARE C1 |
| | DECLARE C2 |
| | DECLARE C3 |
| 60) | OPEN C1 |
| | OPEN C2 |
| | OPEN C3 |
| 70) | WHILE (THERE IS ROW TO FETCH) <br> { <br>     FETCH C1 <br> } <br> WHILE (THERE IS MORE TO FETCH) <br> { <br>     FETCH C2 <br> } <br> WHILE (THERE IS MORE TO FETCH) <br> { <br>     FETCH C3 <br> } |

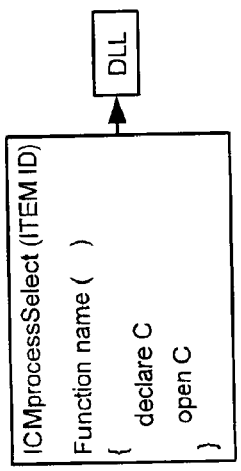
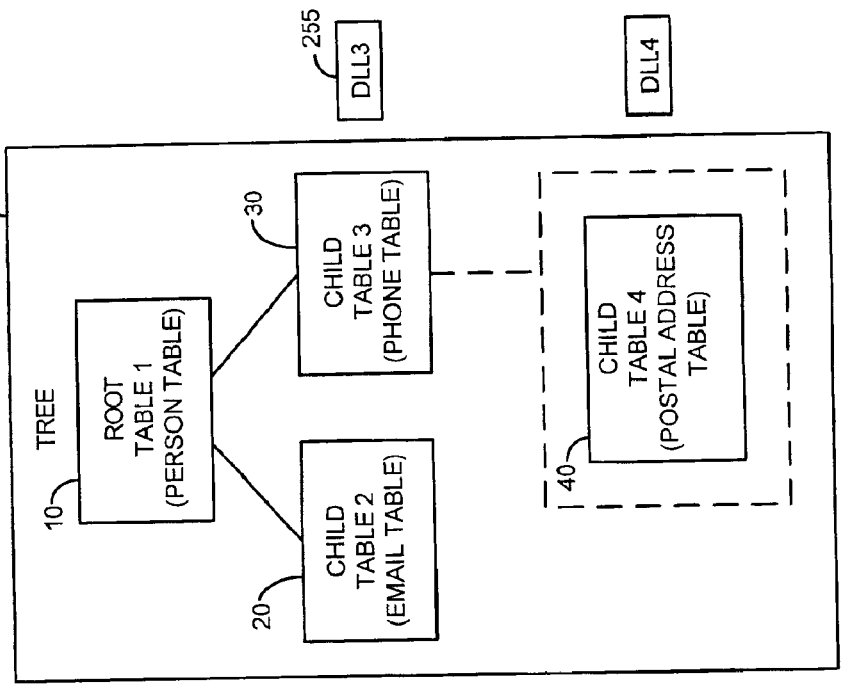
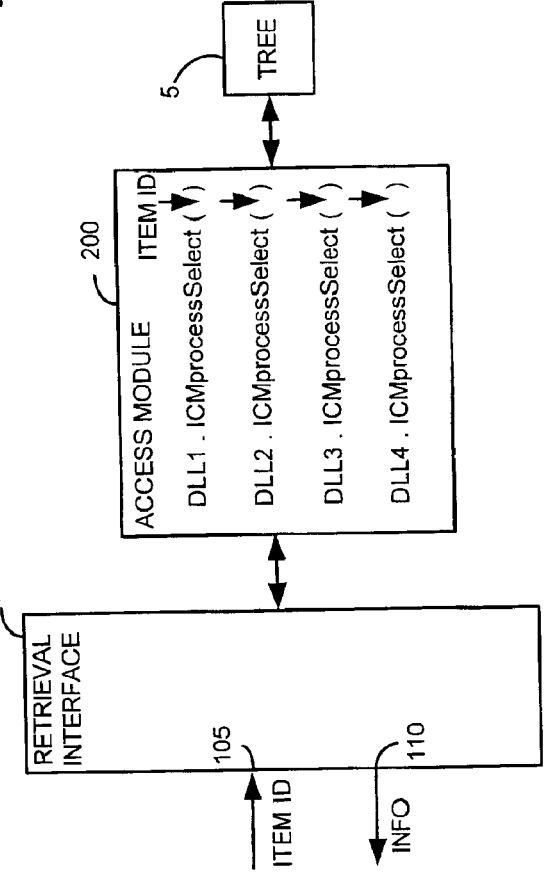
FIG. 6A
FIG. 6B
FIG. 6C

CONTENT MANAGEMENT SYSTEM AND METHODOLOGY EMPLOYING A TREE-BASED TABLE HIERARCHY WHICH ACCOMODATES OPENING A DYNAMICALLY VARIABLE NUMBER OF CURSORS THEREFOR

FIELD OF THE INVENTION

The disclosures herein relate generally to databases and more particularly to methods and apparatus for accessing information stored in content management systems.

BACKGROUND

Conventional content management systems, such as that shown in FIG. 1, typically include a Library Server (LS) 1, one or more Resource Managers (RMs) 2 and a client access application program interface (API) 3. A client 4 is coupled by a network to the API 3 and seeks information stored in the Resource Manager 2. The Library Server 1 stores metadata relating to all objects or data stored in the Resource Manager 2. The Library Server 1 also controls the particular objects that a particular client user can access. Users can submit requests known as queries through the API 3 to search or retrieve metadata stored in the Library Server 1 or objects stored in the Resource Manager 2.

One approach employed to store items in a content management system is to model an item in a single table. Unfortunately, such as single table approach results in many fields among the rows and columns of the table being unused. Such an approach is inefficient from the storage viewpoint.

What is needed is an apparatus and methodology to provide a superior manner of modeling an item through the use of improved table structures.

SUMMARY

When a tree-based table hierarchy is employed to model an item, the number of tables in the model is not known until the model is complete. However, since the number of tables representing a particular item is not initially known, it as also not known how many cursors should be employed to retrieve data from the tables representing the item. To address this problem, a method of organizing information in a content management system is provided. The method includes creating a database including a root table and at least one child table together forming a tree. The method also includes declaring in source code a unique cursor for a table in the tree, and defining in source code an open cursor instruction for the cursor thus declared. The method further includes compiling the source code of the declaring and defining steps into a compiled query assist code structure. The method also includes repeating the declaring, defining and compiling steps for the remaining tables of the tree until a compiled query assist code structure is provided for each table of the tree.

A principal advantage of the embodiment disclosed herein is the solution to the problem of not knowing the correct number of cursors to declare and open in a tree-based table data hierarchy prior to the run time of the data base.

BRIEF DESCRIPTION OF THE DRAWINGS

FIG. 6A is sample code which provides additional detail with respect to the generating access module.

FIG. 6B shows the retrieval interface of the disclosed content management system.

FIG. 6C shows a representative tree structure and respective DLL's for opening cursors.

DETAILED DESCRIPTION

Figure 1:
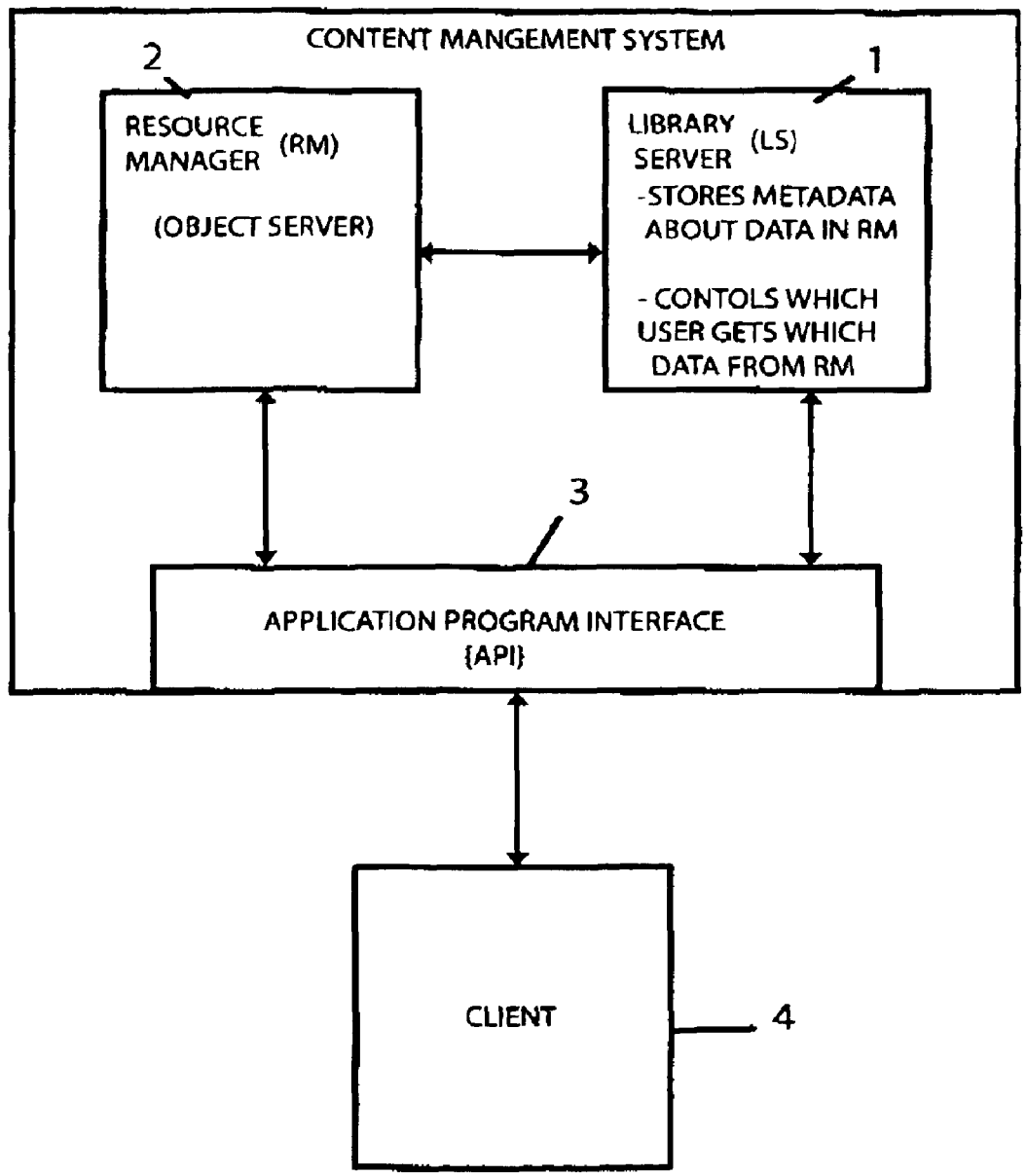
FIG. 1 is a high level block diagram of a conventional content management system showing both server and client.
Figure 2:
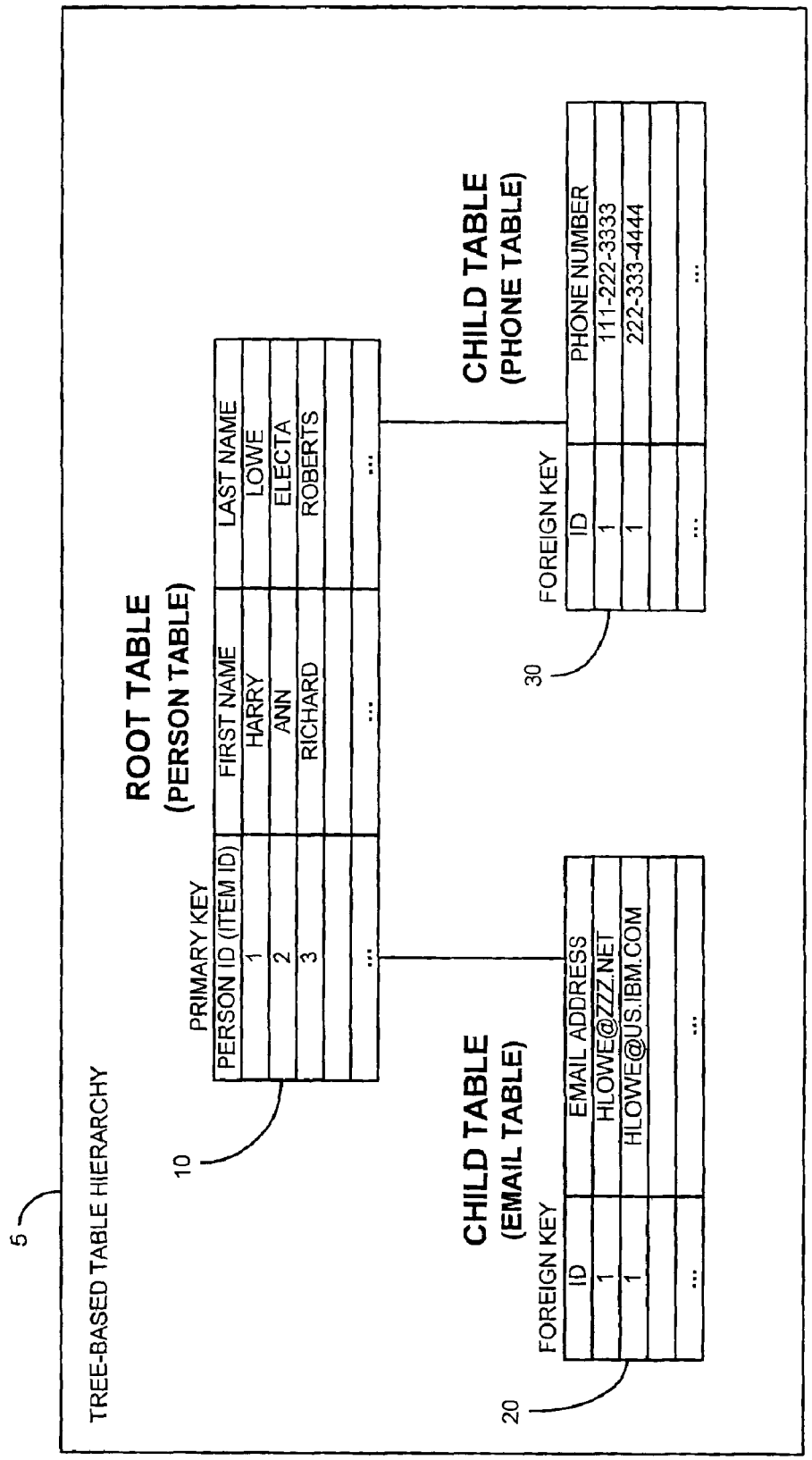
FIG. 2 shows a portion of a content management system including a tree-based hierarchy to represent an item type.

FIG. 2 shows a portion of a content management system including a tree-based hierarchy 5 (or simply tree 5) to represent an item type. An item type is a hierarchy of tables starting at a root table 10 (such as person table 10). Before the content management system or database is set up, it is unknown how many tables will be included in the tree structure representing an item type. Extending from root table 10 can be one or more child tables, each of which may have zero or more child tables of its own. For simplicity in this particular example, it will be assumed that there are two child tables namely child tables 20 and 30. Root table 10, child table 20 and child table 30 together form a tree-based data storage hierarchy.

Root table 10 is a person table which stores a PERSON ID (namely an item ID) and first and last name information in respective columns. The PERSON ID is a primary key. Child table 20 is an email table having foreign keys pointing back to primary keys in root table 10. This child email table 20 includes email address information in a column as shown. In this manner email address information is associated back to PERSON ID's in root table 10. Child table 30 is a phone table having foreign keys pointing back to primary keys in root table 10. This child phone table 30 includes phone number information as shown. In this way, phone number information is associated back to PERSON ID's in root table 10.

Figures 3A, 3B:
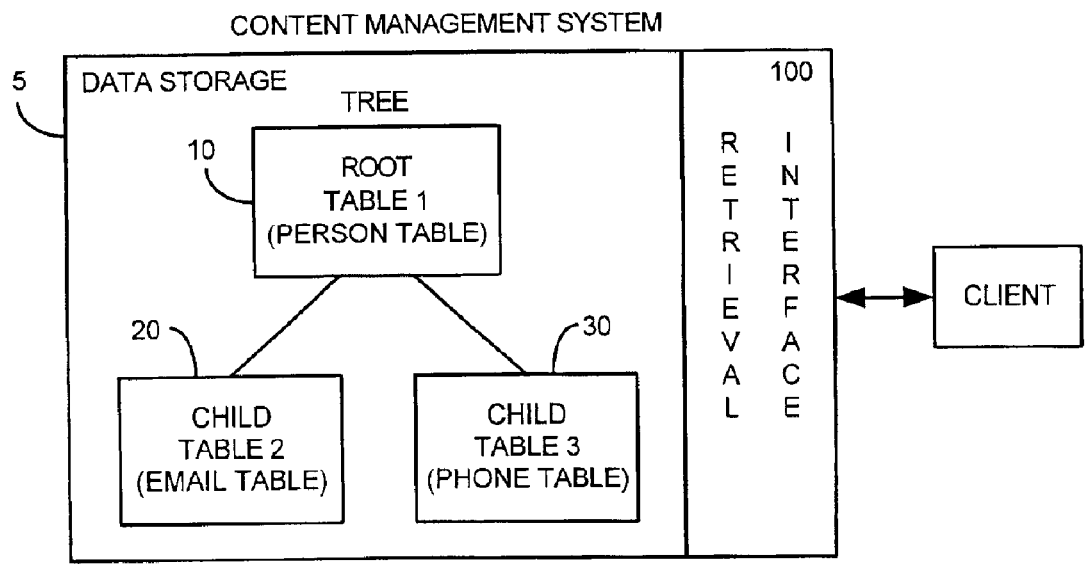
FIG. 3A is a representation of content management system employing a static number of tables.
FIG. 3B is representative application code for retrieving information from the content management system of FIG. 3A.

In this particular example, which will be used to illustrate a problem, the number of tables is static, namely there are three tables 10, 20 and 30 as shown in FIG. 3A. To retrieve information regarding a particular Item ID, application code 40 of FIG. 3B must declare a cursor in each table associated with the particular item ID, open a cursor and fetch data from the cursor at each table. Since the number of tables is already known in this example, this task can be achieved in the following manner.

To retrieve information regarding Harry Lowe (whose PERSON ID=1) application code 40 of FIG. 3B declares a cursor in each of the three tables associated with PERSON ID=1, such as "select * from <table name> where ID=1". The "*" means select all columns. Again, since there are three tables, 3 cursors must be declared, namely one cursor for each table. This is achieved by the DECLARE C1, DECLARE C2 and DECLARE C3 statements of code section 50 of application code 40. The three cursors are then opened in the respective 3 tables by the OPEN C1, OPEN C2 and OPEN C3 statements in code section 60 of application code 40. All ITEM ID data (here PERSON ID data) associated with the three cursors C1, C2 and C3 are then collected by using the WHILE and FETCH statements of code section 70 in application code 40.

In this example, customized code was developed to retrieve the desired information regarding a selected ITEM ID. This customization was possible because the number of tables, and hence the number of cursors to be declared, was already known. Most users will not want to write customized application code to query and retrieve data even if the number of tables and cursors is known in a tree-based hierarchy. Moreover, a very significant problem occurs when the number of tables in a tree-based hierarchy is not known. The table hierarchy is defined at run time and the number of tables in the hierarchy is not known in advance. To further complicate matters, users might desire to revise a database in such a fashion that would later cause additional tables to be added or appended to the existing tree-based hierarchy. Since the number of cursors to be declared is again unknown, customized application code such as application code 40 is simply not able to solve this very significant problem.

Figure 4:
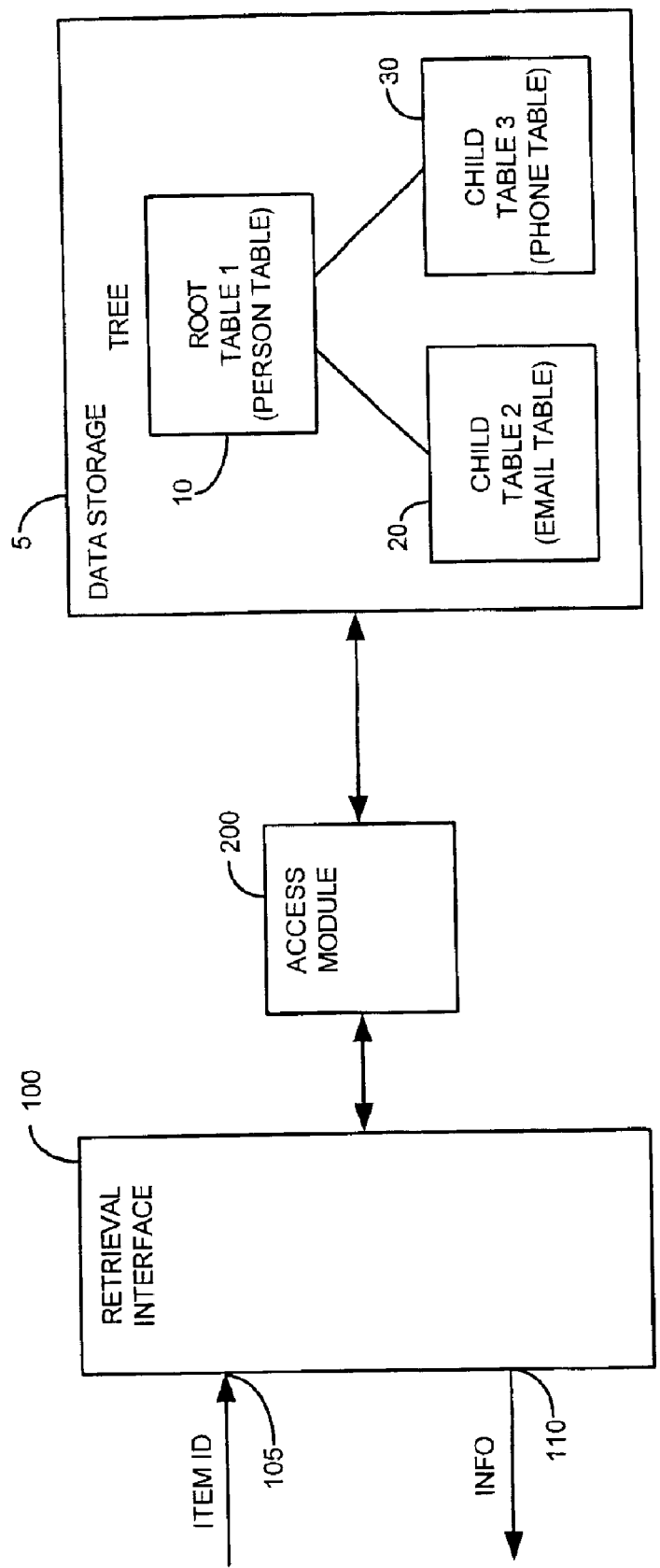
FIG. 4 is a representation of the disclosed content management system.

To solve this problem where the number of tables representing an item is not known in advance, a content management system is provided which includes a retrieval interface 100 as shown in FIG. 4. A query including the Item ID is provided to ITEM ID input 105 and the requesting information is retrieved and supplied to information output 110. In practice, the actual information is not returned by the interface. Rather, the interface returns a set of n cursors and the application can fetch from these cursors to get the actual information. Access module 200, depicted in the path between data storage 5 and retrieval interface 100, operates on the tree-based hierarchy of tables 5 (data storage). In DB2 the cursor name must be unique for each table. In actual practice, the cursor name must be unique across retrieval request, so if users retrieve from 3000 different tables at the same time, they need 3000 cursors. A user can re-use one cursor for different tables, but such a user would have to finish with that cursor before re-using it. For example, they can declare cursor C1 for table A, open C1, fetch C1 until there are no more rows from which to fetch, then re-use cursor C1 for table B, open C1, fetch C1 until there are no more rows, etc. In the content management (CM) retrieval interface architecture, multiple cursors are employed, one cursor for each table, so the same cursor name can not be re-used for all tables. In other words, if there are 3000 tables in the tree hierarchy, 3000 cursors will be defined in this particular embodiment.

Figure 5A:
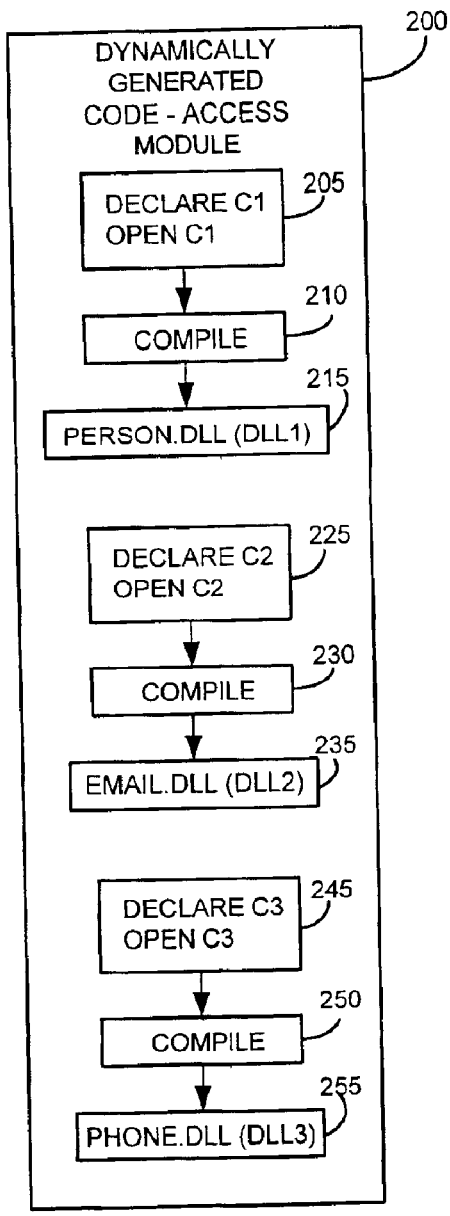
FIG. 5A is an example of a dynamically generated code-access module.

For each table in the tree hierarchy created at run time, a respective dynamic link library (DLL) is provided. These DLLs acting together form "access module" 200. In other words, access module 200 may be viewed as a collection of all DLLs. First, access module 200 is created and then later it is invoked to query the library server of the content management system where the tree-based table hierarchy is stored. The creation of the access module of DLLs is now described. As seen in FIG. 5A, when a table is created in tree 5, a corresponding cursor is declared. For example, in the pseudo-code of access module 200, at block 205 a cursor C1 is declared and cursor C1 is opened. The source code representing the DECLARE C1 and OPEN C1 steps is compiled at block 210 to form PERSON DLL 215 (also referred to as DLL1). PERSON DLL 215 corresponds to root table 10 in FIG. 5B. Similarly, in the pseudo-code of access module 200, at block 225 a cursor C2 is declared and cursor C2 is opened. The source code representing the DECLARE C2 and OPEN C2 steps is compiled at block 230 to form EMAIL DLL 235 (also referred to as DLL2). EMAIL DLL 235 corresponds to email table 20 in FIG. 5B. In a like manner, in the pseudo-code of access module 200, at block 245 a cursor C3 is declared and cursor C3 is opened. The source code representing the DECLARE C3 and OPEN C3 steps is compiled at block 250 to form PHONE DLL 255 (also referred to as DLL3). PHONE DLL 255 corresponds to phone table 30 in FIG. 5B. In actual practice, this compiling of source code is done as part of table defining, not part of the retrieval interface, in one embodiment of the system.

Figure 5B:
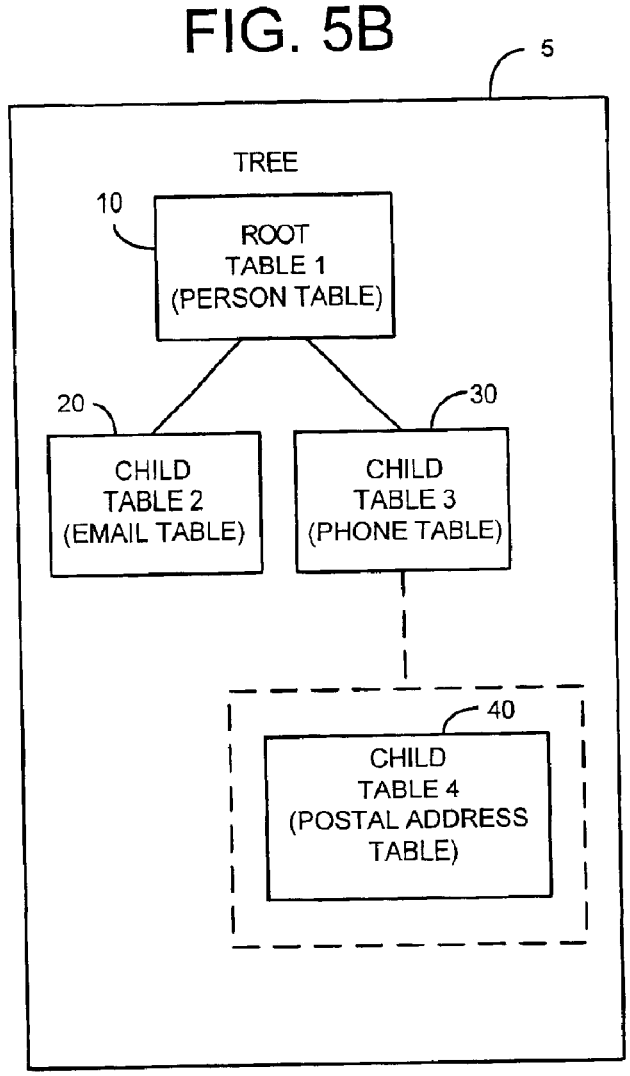
FIG. 5B is a representative tree-based table structure employed in the disclosed content management system.
Figure 5B:
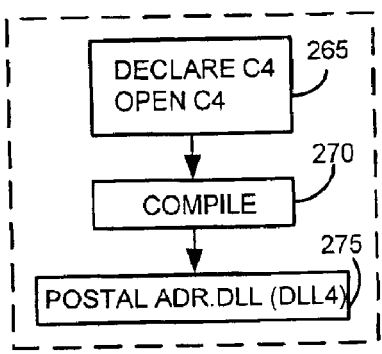

The generation of DLLs is dynamic because the DLL is not generated until a respective table is added to the database. When a new table is added to the database, another DLL is generated for that table on a one-to-one correspondence basis. For example, if at some time after initial database creation it is decided to add another child table, for example postal address table 40 as shown in FIG. 5B, then at that time a corresponding DLL is created in access module 200. More specifically, in a manner similar to that discussed above, in the pseudo-code of access module 200, at block 265 a cursor C4 is declared and cursor C4 is opened. The source code representing the DECLARE C4 and OPEN C4 steps is compiled at block 270 to form POSTAL ADDRESS DLL 275 (also referred to as DLL4). POSTAL ADDRESS DLL 275 corresponds to the recently added postal address table 40 in FIG. 5B shown within dashed lines. Thus, as additional tables are added to the database, respective DLL's are added to access module 200. In contrast to the static approach described earlier with respect to FIG. 3A wherein the number of tables was known, in the solution shown in FIGS. 5A and 5B, DLL's are created as needed, on a dynamic basis, as new tables are added to tree hierarchy 5. Retrieval interface 100 of FIG. 4 together with its access module 200 is so flexible that it can deal with a tree that has an unknown number of tables therein, unlike the static application code depicted in FIG. 3A. Note that a different named cursor is created for each table created in the tree of FIGS. 5A and 5B. One compiled DLL is associated with each table in the tree. As tables are added, additional DLLs are created respectively. At the time of DLL creation, we are not concerned with actually fetching information. Fetching will be accomplished later as described subsequently.

FIG. 6A provides additional detail with respect to generating access module 200. For a representative function named ICMprocessSelect (ITEM ID) a function name is provided and inside this function name a cursor is declared and opened. The declare and open is inside of the function as shown. The resultant source code is compiled to provide a DLL for a particular table. This is repeated with a different cursor name for each table. When a table is later added, this process is again repeated to generate a DLL for the new table. Thus, each DLL for each table includes a function which encloses two statements, namely a declare cursor and an open cursor statement. When the DLL is later called, the function is invoked and the declare cursor and open cursor operations are performed. This is followed by an appropriate number of fetch operations for each table until all information corresponding to the input ITEM ID is retrieved. In actual practice, the fetch operations will be performed in the application using the retrieval interface, not inside the retrieval interface. The application does not need to know in advance how many cursors the interface returns since it can keep fetching until there is no more result set. One cursor yields back one result set.

More detail is now provided with respect to access module 200 of FIG. 6B which depicts retrieval interface 100 having an ITEM ID input 105 and an information retrieval output INFO 110. When the user desires to retrieve ITEM ID information, the desired ITEM ID (for example, 1 for Harry Lowe) is input to ITEM ID input 110. The number 1 is then provided as the variable to the function ICMprocessSelect in each of the DLL1, DLL2, DLL3 and DLL4 in retrieval interface 100. (In other words, the Item ID is passed to the DLLs in access module 200 by retrieval interface 100.) Each of these DLL's declares a cursor and opens a different cursor in respective tables 10, 20, 30 and 40. Any rows in these tables having an ITEM ID of 1 are then fetched. In actual practice, the fetch is not performed inside the interface. Rather, the fetch just returns opened cursors to the application, so that output 110 does not have the actual information, just the cursors corresponding to the information. These DLLs act in the role of query assist code structures to facilitate the extraction of data from the tables in the tree-based table architecture of the content management system.

Sample source code for generating the need cursor is set forth below:

The following is representative source code which creates a Select statement based upon the type of input ITEM ID. An entire matching row need not be fetched, but rather selected columns can be retrieved as desired.

```
// ---------------------------------------------------------------
// Create the Select statement based upon the type of input Ids
// ---------------------------------------------------------------
   __sstmt = &sstmt[0];
   strcpy(__sstmt, "SELECT CompClusterID, ComponentID, ItemID,
   VersionID,
ACLCode, SemanticType, CompKey, RMCode, SMSCollCode,
ResourceLength,
MIMETypeID, RMObjTS, ResourceFlag, XDOClassID, ExtObjectName,
TIEFlag,
TIERef, ATTR0000001010 FROM ICMUT01000001 WHERE");
   switch ( sVerCategory )
```

It is noted that ICMUT01000001 is an arbitrary name of a particular table named by the user and from which we are retrieving information. WHERE represents a row.

```
/*----------------------------------------------------------------*/
/* Create and Open a Cursor which selects rows in the Component View */
/*----------------------------------------------------------------*/
/* Generates a cursor which selects rows from this Component View.  */
/* The cursor is opened for later fetching by the calling program.  */
/* Sample cursor would be -                         */
/*       SELECT * FROM ICMUT01000001                */
/*         WHERE ITEMID IN (A1001001A00D07C02243B23987,  */
/*             A1001001A00D07C02243B23988,  */
/*             A1001001A00D07C02243B23989) AND */
/*         (EXISTS (SELECT 1 FROM ICMSTCOMPILEDACL AS ICMC */
/*             WHERE ICMC.ACLCODE = 3 AND        */
/*                ICMC.USERID = ? AND         */
/*                ICMC.PRIVDEFCODE = 121))      */
/*         ORDER BY ITEMID                 */
/*                                  */
/*Input: pszUserId (UserId to verify against ACL)       */
/*      type    (Type of Ids in idArray, where      */
/*              1=ItemIds, 2=ComponentIds, 3=ParentCompIds) */
/*      sVerCategory (Category of Version Ids supplied, where  */
/*              -1=All, 0=Latest, 1=Specific Version)  */
/*      idArray   (Array of Ids to include in the selection) */
/*      numElements (Number of Ids in idArray)        */
/* Output: 1RC                            */
/*      1SQLcode                         */
/*----------------------------------------------------------------*/
extern "C" short ICMprocessSelect( char    *pszUserId,
                    short   type,
                    short   sVerCategory,
                    ICMDLLINPUT *pidStruct
                    int    numElements,
                    long    *1RC,
                    long    *1SQLcode)
{
// Local variables
struct sqlca sqlca;
int    i;
char   buffer[256];
char   sstmt[MAX_SQL_STMT_LENGTH];
char   *pszCategory[3] = {"ITEMID", "COMPONENTID", "PARENTCOMPID"};
```

The following is representative source code for declaring a cursor:

```
// Declare a cursor - name equal to view name
EXEC SQL DECLARE personne1001    CURSOR FOR STMT;
EXEC SQL PREPARE STMT FROM:_sstmt;
if (sqlca.sqlcode !=0)
{
    *1RC = RC_ITEM_SELECT_ERROR;
    *1SQLcode = sqlca.sqlcode;
    return( DB_PREPARE_CURSOR);
}
```

The following is representative source code for opening a cursor:

```
// Open cursor and return
EXEC SQL OPEN personne1001           USING :szICMUserId,
                                           :szICMUserId;
    if (sqlca.sqlcode != 0)
    {
        *1RC = RC_ITEM_SELECT_ERROR;
        *1SQLcode = sqlca.sqlcode;
        return( DB_OPEN_CURSOR );
    }
    *1RC = 0;
    return( DB_OK );
}
```

We now need to compile and link the source code to generate a DLL and store the DLL in file system. At run time, the application can load the DLL, invoke the function ICMprocessSelect( ) in the DLL After invoking this function, the application can fetch from this cursor. The cursor name is forced to be different, for example, by naming each cursor with a different name corresponding to each table's respective name for that DLL. In this manner, cursor name conflicts are desirably avoided. The following is representative source code for achieving these functions in Windows NT.

```
//Load the library
    handle = LoadLibrary(szModuleWithPath);
//Get the address of function ICMprocessSelect
    pfnProcAddr = (PICMUTPROC) GetProcAddress
                        ((HINSTANCE) handle,
                         "ICMprocessSelect");
//Run that function
        (PICMUTPROC) pfnProcAddr(
            UserID,
            type,
            sVerCategory,
            idArrayOfStruct,
            numElements,
            p1RC,
            &1SQLCode);
```

To summarize, since the number of tables which the user may ultimately employ in a content management system is not known, when a tree-based table structure is employed to manage user data, the number of cursors needed to retrieve data from the tables is likewise unknown. In the particular content management system embodiment described, after the user takes an action which creates a table, embedded SQL source code is also created. The embedded SQL source code contains a function that declares a cursor associated with a Select statement from the table and then opens the cursor. This source code is dynamically compiled and linked to generate a DLL (dynamic link library) or shared library (in a UNIX platform). This only needs to be done once per table. When the querying application needs to open all the cursors for all the tables of the tree-based table hierarchy, the system loads the DLL corresponding to each respective table and invokes the function in the DLL to declare a cursor, open the cursor, and fetch all matching data rows (or specified columns in matching rows) in the table with which the particular DLL is associated. In actual practice, the fetching is done in the application side.

The disclosed content management system methodology and apparatus advantageously solves the problem of not knowing the correct number of cursors to declare and open in a tree-based table data hierarchy prior to the run time of the data base. The content management system can be stored on virtually any computer-readable storage media, such as CD, DVD and other magnetic an optical media in either compressed or non-compressed form. Of course it can also be stored in a server computer system.

Although illustrative embodiments have been shown and described, a wide range of modification, change and substitution is contemplated in the foregoing disclosure and in some instances, some features of an embodiment may be employed without a corresponding use of other features. Accordingly, it is appropriate that the appended claims be construed broadly and in a manner consistent with the scope of the embodiments disclosed herein.

What is claimed is:

1. A method of organizing information in a content management system comprising the steps of:
   creating a database including a root table and at least one child table together forming a tree;
   declaring in source code a unique cursor for a table in the tree;
   defining in source code an open cursor instruction for the cursor thus declared;
   compiling the source code of the declaring and defining steps into a compiled query assist code structure; and
   repeating the declaring, defining and compiling steps for the remaining tables of the tree until a compiled query assist code structure is provided for each table of the tree.

2. The method of claim 1 wherein the compiled query assist code structure is a dynamic link library (DLL).

3. The method of claim 1 wherein the compiled query assist code is a shared library.

4. The method of claim 1 further comprising appending an additonal child table to the tree.

5. The method of claim 4 further comprising repeating the declaring, defining and compiling steps to provide a compiled query assist code structure associated with the additional child table.

6. The method of claim 1 further comprising providing a retrieval interface including a compiled query assist code structure for each table of the database.

7. The method of claim 6 further comprising providing an item ID to the retrieval interface to initiate a query of the database for items in the database matching that item ID.

8. The method of claim 7 further comprising loading, in response to the query, the respective query assist code structures corresponding to each table of the tree.

9. The method of claim 8 further comprising declaring and opening cursors in each table of the tree in response to the query assist code structures being loaded.

10. The method of claim 9 further comprising fetching information matching the item ID in the query from the respective cursors associated with each table in the tree.

11. A computer program product for organizing information in a content management system, the computer program product including a plurality of computer executable instructions stored on a computer readable medium, wherein the instructions, when executed by the content management system, cause the system to perform the steps of:

creating a database including a root table and at least one child table together forming a tree;

declaring in source code a unique cursor for a table in the tree;

defining in source code an open cursor instruction for the cursor thus declared;

compiling the source code of the declaring and defining steps into a compiled query assist code structure; and repeating the declaring, defining and compiling steps for the remaining tables of the tree until a compiled query assist code structure is provided for each table of the tree.

12. The computer program product of claim 11 wherein the computer readable medium is an optical disk.

13. The computer program product of claim 11 wherein the computer readable medium is a magnetic disk.

14. A content management system comprising an information storage facility including a database having a root table and at least one child table together forming a tree;

a retrieval interface, coupled to the information storage facility, including a plurality of compiled query assist code structures, the compiled query assist codes structure being associated with respective tables of the tree, the compiled query assist code structures including compiled declare cursor and compiled open cursor instructions.

15. The content management system of claim 14 further comprising means for providing an item ID to the retrieval interface to initiate a query of the database for items in the database matching that item ID.

16. The content management system of claim 15 further comprising loading means for loading, in response to the query, the respective query assist code structures corresponding to each table of the tree.

17. The content management system of claim 16 further comprising declaring and opening means for declaring and opening cursors in each table of the tree in response to the query assist code structures being loaded.

18. The content management system of claim 17 further comprising fetching means for fetching information matching the item ID in the query from the respective cursors associated with each table in the tree.

* * * * *